United States Patent [19]
Cartun

[11] 3,894,174
[45] July 8, 1975

[54] INSULATED STAPLE AND METHOD OF MAKING THE SAME

[75] Inventor: Walter P. Cartun, Avon, Conn.

[73] Assignee: Emhart Corporation, Hartford, Conn.

[22] Filed: July 3, 1974

[21] Appl. No.: 485,426

[52] U.S. Cl. .................... 174/159; 29/432; 29/450; 59/77
[51] Int. Cl..... H01b 17/00; F16b 15/00; B21g 7/02
[58] Field of Search ...... 174/159, 164; 29/428, 432, 29/432.1, 432.2, 450, 469; 85/49; 59/71, 77; 248/71

[56] References Cited
UNITED STATES PATENTS
3,751,902  8/1973  Kingsbury et al. ..................... 59/71
3,787,608  1/1974  Colby et al. ......................... 174/159

Primary Examiner—Laramie E. Askin
Attorney, Agent, or Firm—McCormick, Paulding & Huber

[57] ABSTRACT

An insulated staple is formed from a U-shaped body member and a piece of flexible, plastic tube, mounted on the body member with the end portions of the tube positioned coaxially on the legs of the staple and with the intermediate portion of the tube extending between the legs and under a bridging section of the body member. The staple is made by cutting a section of plastic tubing from a larger, extended section and piercing the pointed legs of the U-shaped body member through one side wall of the tube into the tube interior. The end portions of the tube are bent into alignment with the parallel legs, and are driven onto the legs following the piercing operation so that the end portions are mounted coaxially on the legs. The intermediate portion of the tube between the points in the side wall pierced by the legs provides insulation between the bridging section of the body member and an electrical or other conduit captured by the staple when in use.

10 Claims, 8 Drawing Figures 3,894,174

SHEET 1

INSULATED STAPLE AND METHOD OF MAKING THE SAME

CROSS REFERENCE TO RELATED APPLICATION

The subject matter in this application is related to subject matter in a co-pending application Ser. No. 457,777 filed Apr. 4, 1974 by Colby et al entitled "Method of Installing an Insulating Sleeve on a Staple" and U.S. Pat. No. 3,787,608 by Colby et al entitled "Insulated Stapling Device", the application and patent having the same Assignee as this application.

BACKGROUND OF THE INVENTION

The present invention relates to an insulated staple and a method of making the staple. More particularly, the present invention is related to an insulated staple made by installing a section of tubing on a U-shaped, metallic staple.

U-shaped staples for mounting conduits such as electrical or fluid conduits to other objects are well known in the art as indicated by U.S. Pat. Nos. 662,587, 2,291,148, 2,351,608 and 2,526,902. In a typical installation where such staples are employed, the elongated conductor is held in place by the component parts of the staple comprising a bridging section interconnecting two generally opposed and parallel legs straddling the conductor. The parallel legs have pointed, free ends which are driven into the supporting object by a hammer or other tool. The bridging section of the U-shaped staple is frequently lined or covered with an insulating material so that the conduit or cable being supported is held in isolated relationship from the staple. In this respect, the use of the terms "insulated", "insulating" or "insulation" in this specification is intended to encompass electrical, thermal and vibrational insulating characteristics, all of which can be advantageously employed between mounting staples and a supported conduit.

While many insulated staples of the prior art have been made by mounting insulators on the legs of a U-shaped body member under the bridging section of the staple as in U.S. Pat. No. 2,291,148 or by molding an insulator onto the bridging section and connecting legs of the staple as in U.S. Pat. No. 2,526,902, it is believed that U.S. Pat. No. 3,787,608 and co-pending patent application Ser. No. 457,777 to Colby et al, referenced above, are the most pertinent prior art for the present invention. In the co-pending application a section of tube is cut to a length greater than the length of the bridging section of the staple body member but less than the combined lengths of the staple legs and the bridging section. A wall portion is cut out of the tube so that the legs of the staple body member can be inserted through the cut-out and through the respective end portions of the tube. The staple produced by this method has the end portions of the insulating tube mounted coaxially on the respective legs of the body member, and the intermediate portion of the tube between the end portions provides a layer of insulation under the bridging section of the body member. The thickness of the insulation is, therefore, equal to the wall thickness of the insulating tube.

The method for making an insulated staple in accordance with the present invention provides a double layer of insulation under the bridging section and does not require removing a section of wall from the insulating tube.

It is, accordingly, a general object of the present invention to disclose a staple and method of making the same which constitutes an improvement over the staple and method disclosed in the co-pending application Ser. No. 457,777 and U.S. Pat. No. 3,787,608 above.

SUMMARY OF THE INVENTION

The present invention resides in an insulated staple and a method of making the staple from a flexible tube and a U-shaped body member having two spaced and generally parallel legs interconnected by a bridging section. The free ends of the legs opposite the ends interconnected by the bridging section are pointed for penetration into wood or other structure to which the finished staple and a captured conduit are to be mounted. The flexible tube is formed from an insulating material such as polyvinyl chloride or polyethylene plastic, and is cut to a length between its axial ends less than the combined lengths of the parallel legs and the bridging section and greater than the length of the bridging section alone. With such a length the installed tube provides insulation along the bridging section and adjacent upper portions of the legs.

The tube is installed on the U-shaped body member by piercing the pointed, free ends of the parallel legs on the body member through one side wall of the tube into the hollow tube interior. The legs pierce the side wall at an intermediate portion of the tube so that the opposite end portions of the tube between the respective axial ends and the points of piercing may subsequently be mounted on the legs.

The flexible tube is also bent into a U-shaped configuration with the opposite end portions of the tube in alignment respectively with the parallel legs of the body member. Then the parallel legs of the body member and the end portions of the bent tube are forced or pushed relative to one another to slide the end portions of the tube coaxially onto the respective legs of the body member.

When the tube is pushed all the way onto the legs, the intermediate portion of the tube extending under the bridging section provides a double layer of insulation between the body member and a conduit captured or held by the staple. Since it is not necessary to remove the longitudinal wall portion from the tube prior to installation on the body member, the method of the present invention may be less expensive than that disclosed in the co-pending application referenced above and provides twice as much insulation under the bridging section of the U-shaped body member.

DESCRIPTION OF THE PREFERRED EMBODIMENT

Figure 1:
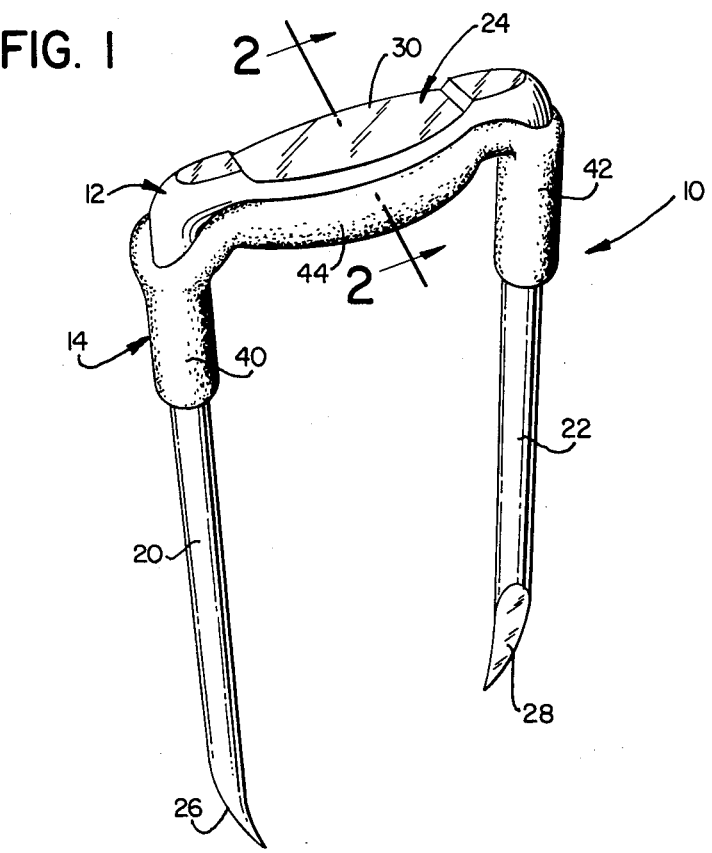
FIG. 1 is a perspective view of the insulated staple made in accordance with the present invention.
Figure 2:
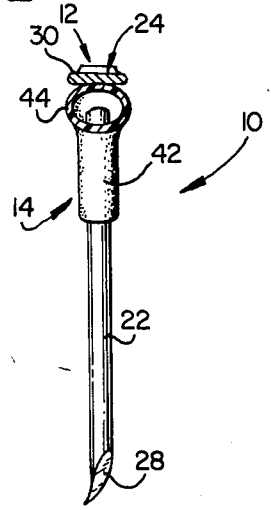
FIG. 2 is a cross-sectional view of the insulated staple in FIG. 1 as viewed along the sectioning line 2—2.

FIGS. 1 and 2 show one embodiment of the insulated staple of the present invention. The staple, generally designated 10, is comprised of two basic components, a U-shaped body member 12 and an insulator taking the form of a non-metallic, flexible tube or sleeve 14 mounted on the body member.

The U-shaped body member 12 is a conventional, non-insulated staple known in the prior art and formed from a heavy gauge wire stock of a conductive metal such as a steel alloy. The formation of a U-shaped body member of this type is not new in the art and is well known, one such forming operation and associated apparatus being described in the above-referenced U.S. Pat. No. 2,351,608. A further description of the metal forming operation is not provided or considered necessary with respect to the present invention.

As shown in FIG. 1, the body member 12 is comprised principally of two opposed and parallel legs 20 and 22, each of which is pointed at the free ends 26 or 28 respectively, and a bridging section 24 integrally joined with and interconnecting the upper ends of the legs 20 and 22 opposite the pointed free ends 26 and 28. It will be noted that the pointed ends 26 and 28 of the legs 20 and 22 have point-forming shear planes facing in opposite transverse directions relative to the plane of the U-shaped body member 12. As a consequence, the free ends 26 and 28 of the staple legs are aligned in a direction which is slightly out of the plane of the body member 12.

The bridging section 24 integrally connected between the parallel legs 20 and 22 includes a depressed flat or saddle 30 at its center portion which permits only the portions of the body member at the upper ends of the legs and outer ends of the bridge section to be exposed to the driving blows of a hammer that urge the pointed ends 26 and 28 of the legs into a support or base to which a conduit or other object is to be fastened by the staple 10. With such construction, the driving blows are transmitted directly through the parallel legs to the pointed tips and facilitate anchoring the staple to a support.

The insulating tube 14 is cut to a length measured along the axis of the tube less than the total length of the two parallel legs 20 and 22 and the bridging section 24 of the body member 12, but greater than the length of the bridging section 24 alone so that when the tube is mounted on the body member, the free or projecting ends 26 and 28 of the legs 20 and 22 are fully exposed for penetration into a support and the upper portion of the staple 10 is fully lined along the inner periphery which contacts the supported conduit. The tube 14 is formed from a flexible insulating material, preferably a plastic such as polyvinylchloride or polyethylene, and has a hollow cylindrical interior with a diameter corresponding approximately to the outside diameter of the heavy gauge wire forming the body member 12 to receive the legs 20 and 22 in close fitting contact. Although the tube and the body member are illustrated as having circular cross sections throughout the drawings, it is readily apparent that tubes and body members having rectangular, oval and other cross sections can be employed. It is desirable, however, that the tube and the legs of the staple be held in frictional engagement when the tube is installed so that the tube does not fall off of the body member before the staple is mounted in a support with a conduit under the bridging section 24.

The tube 14 has two axially opposite end portions 40 and 42 which completely encircle and mount coaxially on the upper ends of the legs 20 and 22 respectively when the tube is mounted on the body member 12 as shown in FIGS. 1 and 2. The length of the end portion along the legs affects the depth of penetration of the legs since the forces required to drive the legs further into an object increases significantly after the end portions have engaged the object. An intermediate portion 44 of the tube 14 interconnects the opposite end portions 40 and 42 and, when mounted on the body member, extend along the inner periphery of the bridging section 24 to provide insulation.

Figure 3:
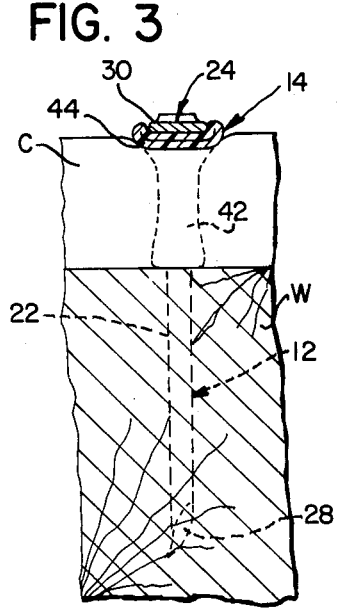
FIG. 3 is a cross-sectional view of the insulated staple shown holding a captured conduit on a wooden support structure.

As seen most clearly in the cross sectional views of FIGS. 2 and 3, the tube 14 provides a double layer of insulation under the bridging section 24 so that the total thickness of the insulation is equal to twice the wall thickness of the tube. Also, as shown in FIG. 3 when the staple is used to hold a captured electrical or other conduit C tightly against a wooden or other support structure W, the intermediate portion 44 of the tube 14 is seated tightly against the bridging section 24 and the flattened wall portions of the tube overlap and partially envelop the saddle 30. The overlapping wall portions reduce the opportunity for the supported conduit C to contact the metal of the bridging section 24. This mode of insulating the bridging section is particularly desirable, where, for example, the cable is suspended in festoons by the staples, or is otherwise bent over the bridging section 24. Furthermore, the outer or top side of the bridging section is fully exposed at all times to receive the blows of a hammer that drives the staple into a support. Accordingly, the insulation is not damaged during installation and a double thickness of insulation always separates the bridging section from a captured conduit.

Figure 4E:
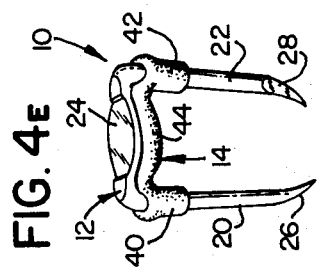
FIGS. 4a–4e are a series of views showing the steps by which the flexible insulating tube is installed on the U-shaped body member of the staple.
Figure 4D:
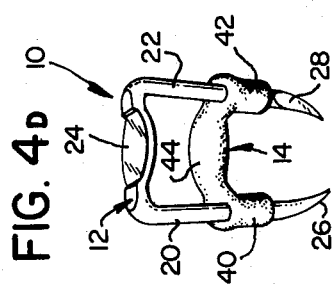
Figure 4C:
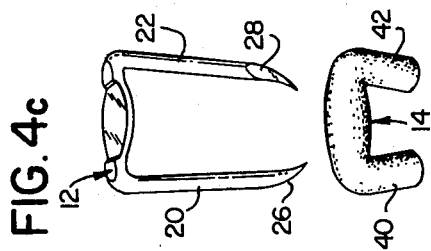
Figure 4B:
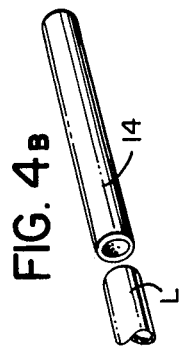
Figure 4A:
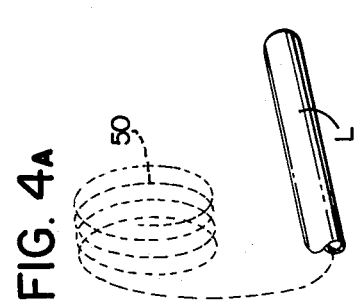

The steps of the novel method for installing the tube 14 on the U-shaped body member in accordance with the present invention are depicted in the sequence of FIGS. 4a–4e. In FIG. 4a, an extended length of non-metallic, flexible tubing is wound in a coil or roll 50 (shown schematically) and a generally straight length of the tubing L is unreeled at one free end of the coil. In FIG. 4b, a short segment of the tubing L is cut off to form the tube 14 having a length between its axial ends less than the combined length of the two parallel legs 20 and 22 and the bridging section 24 of the body member 12 and greater than the length of the bridging section alone.

In FIG. 4c the pointed, free ends 26 and 28 of the legs 20 and 22 are placed adjacent the one side wall of the tube 14 with the legs arranged generally in a direction perpendicular to the side wall at the locations where the side wall and ends 26 and 28 are closest. If desired, the flexible tube 14 may be bent from its generally straight configuration shown in FIG. 4b into a U-shaped configuration such as that illustrated. In the illustrated case, the opposite end portions 40 and 42 of the tube 14 are aligned respectively with the parallel legs 20 and 22, but the legs are not precisely perpendicular to the closest side wall portions of the tube. Nevertheless, the legs extend in a direction which forms a substantial angle with the closest side wall portions of the bent tube.

It should also be noted that the tips of the leg ends 26 and 28 may not lie in precisely the same plane as the parallel legs 20 and 22 and, correspondingly the tips would not be precisely located over the axis of the bent tube 14 in the same plane as the tube. A slight rotation of the tube 14 and body member 12 relative to one another is desirable to bring the tips of the ends 26 and 28 closer to the plane of the bent tube. Within the scope of the present application, however, the legs 20 and 22 are considered to be substantially aligned with the end portions 40 and 42 of the tube even though the slight rotation may have been imparted to the tube and body member.

In FIG. 4d the body member 12 and the tube 14 are shown after the pointed ends 26 and 28 pierce through the adjacent side wall of the tube, into the hollow tube interior at the intermediate portion 44 of the tube between the opposite end portions 40 and 42 and are then forced or driven out through the opposite end portions 40 and 42 so that the end portions slide coaxially onto the legs 20 and 22 respectively. It will, accordingly, be understood that since the points on the ends 26 and 28 of the body member establish the initial contact with the side wall of the tube and thereby establish the general center of the hole produced in the side wall during the piercing step, it is desirable that the points be positioned approximately in the plane of the bent tube at the beginning of the piercing step.

It should also be noted that the configuration of the tube 14 at the beginning of the piercing step may be straight as shown in FIG 4b or at any intermediate configuration between the straight or U-shape shown in FIGS. 4b and 4c. It is important, however, that the angular relationship of the legs 20 and 22 and adjacent areas on the side wall of the tube 14 be perpendicular or at a substantial angle approximating perpendicularity so that the points will pierce the side wall rather than slide over the wall and possibly dislocate the tube and body member relative to one another.

Accordingly, the step of bending can be performed before, during or after the piercing step and in a preferred form of the invention, the bending is performed at least in part prior to the step of piercing and at least in part during the step of piercing as the body member and tube are brought together. The bending step, if partially completed during the step of piercing is aided by the ends 26 and 28 of the legs as they are forced through the end portions 40 and 42 of the tube 14 provided that the end portions are first bent substantially into alignment with the parallel legs 20 and 22.

The process of assembling the insulated staple 10 may be terminated at the stage indicated in FIG. 4d with the tube 14 forced partially onto the parallel legs 20 and 22. At this stage, friction between the legs and end portions 40 and 42 holds the tube 14 on the body member 12. When the staple is subsequently used to attach a conduit to a support, the tube 14 is pushed upwardly along the legs by the conduit until the intermediate portion 44 is pressed into contact with the bridging section 24 as shown in FIG. 4e.

However, it is also contemplated that the tube can be pushed into the fully seated position in contact with the bridging section 24 prior to use with a conduit. In such case, a punch or other instrument is used to push the end portions 40 and 42 in sliding relationship along the legs 20 and 22 respectively toward the connections of the legs and bridging section. There is, of course, less chance of having the tube 14 come off of the body member 12 when the intermediate portion 44 is seated or in contact with the bridging section because the sharp bend imposed upon the tube at the connection between the legs and bridging section increases the frictional forces between the end portions 40 and 42 and the respective legs 20 and 22 on which they are coaxially mounted.

Thus, it is seen that an insulated staple is made by mounting a flexible tube 14 on a U-shaped body member 12 so that opposite end portions 40 and 42 of the tube are positioned coaxially on the parallel legs 20 and 22. It is not necessary to remove a wall section from the tube since the pointed ends 26 and 28 of the body member are driven through the side wall of the tube in a piercing operation. The intermediate portion 44 of the tube forms a double layer of insulation under the bridging section 24 and may partially envelop the bridging section particularly when the tube is pressed against the bridging section by a captured conduit.

While the present invention has been disclosed in a preferred embodiment, it should be understood that further modifications and substitutions can be had without departing from the spirit of the invention. The method of making the insulated staple 10 may be accomplished manually or by machine. A machine having the basic components for assembling the tube 14 on the body member 12 would be similar to that shown and described in U.S. Pat. No. 3,751,902 having the same assignee as the present invention. Accordingly, the present invention has been described in a preferred embodiment by way of illustration rather than limitation.

I claim:

1. A method of making an insulated staple comprising the steps of:

providing a U-shaped body member having two spaced and generally parallel legs and a bridging section connected to one end of each leg opposite the spaced, free ends of the legs, the free ends being pointed;

providing a flexible tube formed from an insulating material and having a predefined length between the axial ends of the tube less than the combined lengths of the two parallel legs and the bridging section of the body member, and greater than the length of the bridging section alone;

piercing the pointed, free ends of the parallel legs on the body member through one side wall of the tube into the hollow tube interior at an intermediate portion of the tube between the opposite end portions of the tube;

bending the flexible tube into a U-shaped configuration with the opposite end portions of the tube substantially in alignment with the parallel legs of the body member respectively; and, then forcing the parallel legs of the body member and the end portions of the bent tube relative to one another to slide the end portions of the tube coaxially onto the respective legs of the body member.

2. A method of making an insulated staple as defined in claim 1 wherein the step of bending is performed at least in part prior to the step of piercing.

3. The method of making an insulated staple as in claim 1 wherein the step of bending is performed at least in part during the step of piercing.

4. The method of making an insulated staple as defined in claim 1 including the additional step of pushing the end portions of the tube and the legs of the body member relative to one another until the intermediate portion of the tube and the bridging section of the body member contact one another.

5. A method of making an insulated staple as defined in claim 1 wherein the step of providing a flexible tube comprises providing an extended section of flexible tubing formed from the insulating material and cutting from the tubing section a shorter section of the length defined.

6. A method of making a staple as in claim 1 wherein the step of providing a flexible tube comprises providing a coil of flexible tubing and cutting a section of tubing from a free end of the coil to form said flexible tube.

7. A method of making a staple as in claim 6 wherein the step of cutting comprises cutting a section of tubing having said predefined length.

8. An insulated staple for anchoring objects to a base comprising:
- a generally U-shaped body member having substantially parallel legs, each leg being pointed at its free end for penetration into a support, and a bridging section joining the legs; and
- a non-metallic, flexible tube bent in a U-shaped configuration and mounted on the U-shaped body member with opposite end portions of the tube positioned coaxially on the respective legs of the body member, completely encircling the portions of the respective legs adjacent the bridging section and exposing the ends of the legs, the tube also including an intermediate portion having a tubular cross section connecting the end portions and extending under the bridging section between the legs to line a substantial part of the inner periphery of the U-shaped body member and to provide a double layer of insulation between the bridging section and a captured object.

9. An insulated staple for anchoring objects as defined in claim 8 wherein:
- the U-shaped body member is formed from a metallic wire stock; and
- the tube is formed from an electrically non-conductive plastic.

10. An insulated staple for anchoring as defined in claim 8 wherein:
- the U-shaped body member is formed from a wire stock having a preselected diameter; and
- the non-metallic tube has an inside diameter substantially equal to the diameter of the wire stock to permit the end portions of the tube to be slid onto the parallel legs of the U-shaped body member.

* * * * *